United States Patent

Aoki

[11] Patent Number: 5,793,221
[45] Date of Patent: Aug. 11, 1998

[54] LCD PANEL TEST APPARATUS HAVING MEANS FOR CORRECTING DATA DIFFERENCE AMONG TEST APPARATUSES

[75] Inventor: Hiroyuki Aoki, Gyoda, Japan

[73] Assignee: Advantest Corp., Tokyo, Japan

[21] Appl. No.: 650,428

[22] Filed: May 20, 1996

[30] Foreign Application Priority Data

May 19, 1995 [JP] Japan ................... 7-145609

[51] Int. Cl.$^6$ ................... G01R 31/22
[52] U.S. Cl. ................... 324/770
[58] Field of Search ................... 324/765, 73.1, 324/158.1, 770, 93; 345/904, 87; 348/129, 126; 257/40, 48

[56] References Cited

U.S. PATENT DOCUMENTS

| | | | |
|---|---|---|---|
| 5,309,108 | 5/1994 | Maeda et al. | 324/770 |
| 5,432,461 | 7/1995 | Henley | 324/770 |
| 5,504,438 | 4/1996 | Henley | 324/770 |
| 5,621,334 | 4/1997 | Urano et al. | 324/770 |

*Primary Examiner*—Vinh P. Nguyen
*Attorney, Agent, or Firm*—Muramatsu & Associates

[57] ABSTRACT

An LCD panel test apparatus for testing an LCD panel and compensating the differences in absolute values of measured data among two or more test apparatuses. The test apparatus includes: a backlight to illuminate the LCD panel under test; a CCD camera having a charge coupled device (CCD) sensor to monitor light signals; a filter to allow a predetermined color of light to pass therethrough; an LCD panel driver which provides a drive signal to the LCD panel under test; an analog-to-digital converter which converts the measured data from the CCD camera to digital data; a CCD address defining part which specifies positions of pixels in the CCD sensor corresponding to pixels of the LCD panel under test and specifies CCD sampling addresses for overall LCD pixels; an image data reproducing part to determine data corresponding to each pixel of the LCD panel under test based on the CCD sampling addresses; a defect determining part which determines defective pixels of the LCD panel under test; a correction table which stores correction coefficients; an image compensation part which compensates differences in measured data between two or more LCD panel test apparatuses using the correction coefficients; and a controller for controlling an overall operation of the LCD panel test apparatus.

8 Claims, 3 Drawing Sheets

LCD PANEL TEST APPARATUS HAVING MEANS FOR CORRECTING DATA DIFFERENCE AMONG TEST APPARATUSES

FIELD OF THE INVENTION

This invention relates to an LCD panel test apparatus for testing an LCD (liquid crystal display) panel, and more particularly, to an LCD panel test apparatus and method for testing an LCD panel and compensating the differences in the absolute values of measured data among the test apparatuses.

BACKGROUND OF THE INVENTION

In testing an LCD (liquid crystal display) panel to find out defects such as display unevenness, an apparatus as shown in FIG. 2 has been used for the various test methods. Basically, in such a test apparatus, a CCD (charge coupled device) camera having a larger number of CCD pixels than that of an LCD under test senses an image displayed on the LCD in a pixel by pixel basis.

In the arrangement of FIG. 2, to acquire an image displayed on the LCD panel by an LCD panel test apparatus by measuring the brightness of each pixel of the LCD by the corresponding pixels of the CCD, the following measurement and calculation steps are proceeded by the LCD test apparatus.

CCD Address for Calibration Dot

First, a calibration pattern having a predetermined number of dots is displayed on the LCD panel and addresses of CCD pixels corresponding to each of the pixels of the LCD involved in each dot of the calibration pattern are specified. FIG. 5 shows an example of the calibration pattern which is displayed on the LCD panel having 640×480 pixels. The calibration pattern shown in FIG. 5 has 25 dots displayed on the LCD.

The brightness of each dot on the LCD pixel is sensed by a larger number of CCD pixels, for example, four pixels of the CCD area sensor having, for example, 1534×1025 pixels. FIG. 3 illustrates such a situation for sensing the brightness of each pixel of the LCD displaying the dot of the calibration pattern. In FIG. 3, one LCD pixel displaying the dot 20 is measured by nine CCD pixels 21, i.e., three pixels in a column and three pixels in a row.

To accurately specify the CCD addresses of the dots on the LCD, one of the CCD pixels having the highest brightness is determined for each dot of the calibration pattern. For example, as in FIG. 4A, for the X direction (row) of the CCD pixels, the pixel $X_n$ showing the highest brightness $H_n$ is determined to be a center pixel. With respect to the center pixel $X_n$, the brightness $H_{n-1}$ and $H_{n+1}$ in both sides of the center pixel, i.e., the pixels $X_{n-1}$ and $X_{n+1}$ are measured.

The difference in the brightness between the pixels $X_{n-1}$ and $X_{n+1}$ is considered to determine a precise CCD address in the X direction. For example, in FIG. 4B, it is calculated to determine a position in the pixel $X_n$ which makes the right and left areas equal. This position is shown by a dotted line of FIG. 4B and is defined as an CCD address of the dot in the calibration pattern. This process is expressed by equation: X address=$X_n+(H_{n+1}-H_{n-1})/2H_n$.

The similar process is also taken for the Y direction (column) of the pixels to determine the precise CCD address of the dot in the Y direction. This calculation is proceeded for all of the 25 dots of the calibration pattern displayed on the 25 LCD pixels to determine the CCD addresses in the X and Y directions.

Sampling Address of LCD Pixel

The calibration pattern displayed on the LCD panel has 16 blocks each of which has 4 dots at its four corners as shown in FIG. 5. Based on the CCD addresses of each calibration dot and the LCD pixel address of the dot, all the LCD pixels in each block are defined by CCD addresses. By this process, it is prepared sampling addresses of the CCD indicating all of the pixels of the LCD panel.

Referring back to the LCD panel test apparatus of FIG. 2, the conventional test apparatus includes a backlight 9 provided under a LCD panel 10 to be tested to emit a light to the LCD panel from the rear, an LCD panel driver 11 which provides a drive signal to the LCD panel 10 to display the calibration pattern or various test patterns, a set of filter 8 to separate the brightness of the LCD panel in red (R), green (G), blue (B) and semi-transparent (W), and a CCD camera 12 having a CCD area sensor to measure the brightness of the LCD panel 10.

Further included in the LCD test apparatus are, an A/D converter 13 which converts the measured data from the CCD camera 12 to digital data, a CCD address means 14 which specifies positions of the CCD pixels corresponding to the LCD pixel utilizing the dots in the calibration pattern and defines CCD sampling addresses of overall LCD pixels based on the CCD positions, a presampling means 15 which measures an image displayed on the LCD panel by the CCD camera and converts the data to an image corresponding to the pixel of the LCD panel based on the CCD sampling addresses, a defect determining means 16 which determines defective pixels of the LCD panel based on the data showing the brightness of each LCD pixel, a controller 17 for controlling the overall operation of the LCD panel test apparatus, and a display 19 which displays information including the LCD image, the test process and conditions and the like.

In the foregoing process and configuration of test apparatus, the LCD pixels and the corresponding positions of the CCD pixels are determined and evaluated. The set of filters then is used between the CCD camera and the LCD panel 10 to be tested. The brightness data through each of the R, G, B and W filters for every pixel of the LCD panel is measured by the same process noted above. Various types of defects of the LCD panel, such as unevenness of brightness can be identified.

However, in the LCD panel test apparatus of FIG. 2, when performing the same test for the same LCD panel by a plurality of different test apparatuses, the same test data are not obtainable between the test apparatuses. This is because an intensity of the backlight, a sensitivity of CCD camera, characteristics of the RGBW filters or an amplifier gain and other performances such as of the A/D converter in each test apparatus cannot be the same as that of the other test apparatus. Thus, there exist differences of absolute values of the test data among the LCD test apparatuses, which makes the test results unreliable.

In such a situation, adjustment is made in the intensity of the backlight or the amplifier gain in the A/D converter to minimize the differences in the measured data between the test apparatuses. However, such adjustment is undertaken manually in a cut and try manner and thus is not very reliable. Thus, there is a need to realize an LCD panel test apparatus and method to attain the same test data among a plurality of LCD panel test apparatuses test when testing the same LCD panel.

SUMMARY OF THE INVENTION

Therefore, it is an object of the present invention to provide an LCD panel test apparatus and method which is capable of automatically compensating the differences in the absolute values of measured data among the test apparatuses.

It is another object of the present invention to provide an LCD panel test apparatus and method which is capable of automatically compensating the differences from the other test apparatuses caused by a hardware performance such as an intensity of the backlight, a sensitivity of CCD camera, characteristics of the RGBW filters or an amplifier gain and other performances including the A/D converter in each LCD panel test apparatus.

It is a further object of the present invention to provide an LCD panel test apparatus which is capable of automatically compensating the differences among the LCD panel test apparatuses by multiplying the measured data with correction factors stored in a correction table.

It is a further object of the present invention to provide an LCD panel test apparatus which is capable of compensating the differences among the LCD panel test apparatuses with high accuracy and efficiency without being subject to reading errors by a user.

In the present invention, the LCD panel test apparatus has an image compensation means and a correction table to automatically compensates the differences among the LCD panel test apparatuses by multiplying the measured data with correction factors stored in the correction table.

The LCD panel test apparatus of the present invention includes: a backlight provided under an LCD panel under test to illuminate the LCD panel under test; a CCD camera having a charge coupled device (CCD) sensor to monitor light signals; a filter provided between the LCD panel under test and the CCD camera to allow a predetermined color of light to pass therethrough; an LCD panel driver which provides a drive signal to the LCD panel under test to display a calibration pattern or various test patterns; an analog-to-digital converter which converts the measured data from the CCD camera to digital data; a CCD address means which specifies positions of pixels in the CCD sensor corresponding to pixels of the LCD panel under test utilizing dots in the calibration pattern and defines CCD sampling addresses for overall LCD pixels based on the CCD positions; a presampling means which receives image data measured by the CCD camera indicating an image displayed on the LCD panel under test and converts the image data to data corresponding to each pixel of the LCD panel under test based on the CCD sampling addresses; a defect determining means which determines defective pixels of the LCD panel under test based on the data corresponding to the each pixel of the LCD panel under test; a correction table which stores correction coefficients; an image compensation means which compensates differences in measured data between two or more LCD panel test apparatuses using the correction coefficients; and a controller for controlling an overall operation of the LCD panel test apparatus.

According to the present invention, the LCD panel test apparatus is capable of automatically compensating the differences in the absolute values of measured data among the test apparatuses. The LCD panel test apparatus of the present invention automatically compensates the differences from the other test apparatuses arisen in a hardware performance such as an intensity of the backlight, a sensitivity of CCD camera, characteristics of the RGBW filters or an amplifier gain and other performances including the A/D converter in each LCD panel test apparatus.

In the present invention, the LCD panel test apparatus automatically compensates the differences among the LCD panel test apparatuses by multiplying the measured data with correction coefficients stored in a correction table. Accordingly, the LCD panel test apparatus of the present invention can compensate the differences among the LCD panel test apparatuses with high accuracy and efficiency without being subject to reading errors of a user.

DETAILED DESCRIPTION OF THE PREFERRED EMBODIMENT

Figure 1:
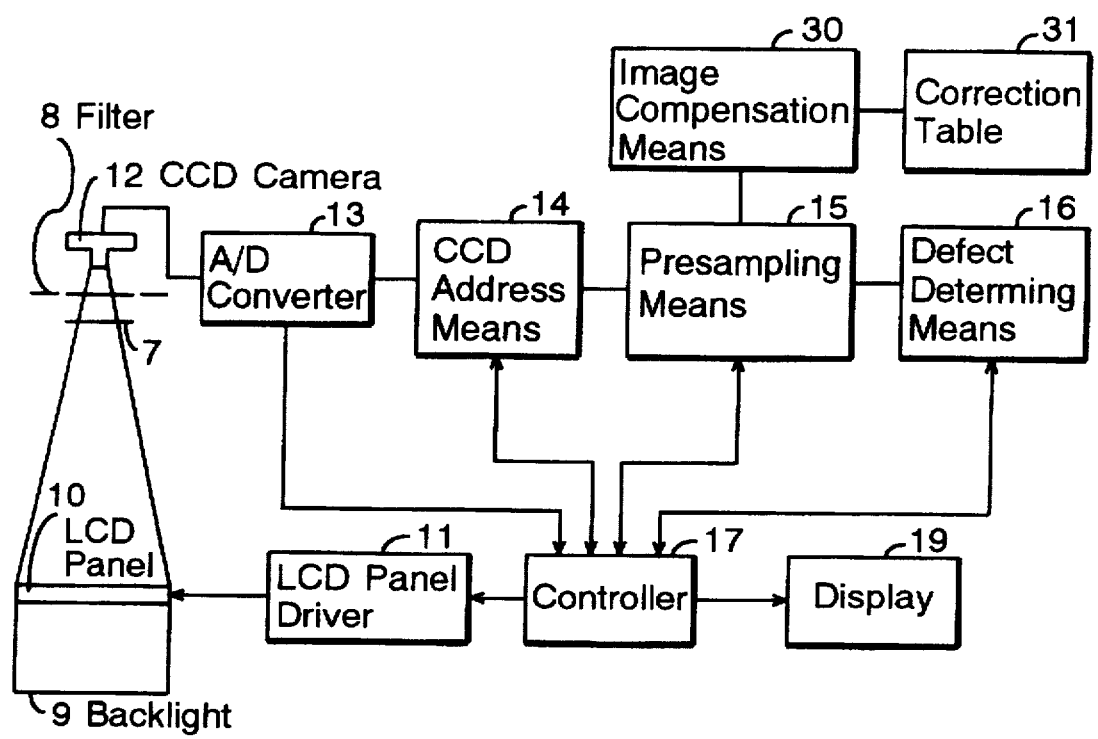
FIG. 1 is a block diagram showing a structure of the LCD panel test apparatus of the present invention.

FIG. 1 shows an embodiment of LCD panel test apparatus of the present invention. In FIG. 1, the LCD panel test apparatus includes a backlight 9 provided under a LCD panel 10 to be tested to emit a light to the LCD panel from the rear, an LCD panel driver 11 which provides a drive signal to the LCD panel 10 to display the calibration pattern or various test patterns, a set of filter 8 to separate the brightness of the LCD panel 10 in red (R), green (G), blue (B) and semi-transparent (W), a neutral density (ND) filter 7 having a lower optical transmissivity, and a CCD camera 12 having a CCD area sensor to measure the brightness of the LCD panel 10.

The LCD test apparatus further includes an A/D converter 13 which converts the measured data from the CCD camera 12 to digital data, a CCD address means 14 which specifies positions of the CCD pixels corresponding to the LCD pixel utilizing dots in the calibration pattern and defines CCD sampling addresses of overall LCD pixels based on the CCD positions, a presampling means 15 which measures an image displayed on the LCD panel taken by the CCD camera and converts the data to an image corresponding to the pixel of the LCD panel based on the CCD sampling addresses, a defect determining means 16 which determines defective pixels of the LCD panel based on the data showing the brightness of each LCD pixel, a controller 17 for controlling the overall operation of the LCD panel test apparatus, an image compensation means 30 which compensates the differences in the measured data among different the LCD panel test apparatuses caused because an intensity of the backlight, a sensitivity of CCD camera, characteristics of the RGBW filters or an amplifier gain and other performances including the A/D converter in each LCD panel test apparatus are different from those of the other test apparatus, a correction table 31 which stores various correction factors and coefficients to compensate the differences among the two or more LCD panel test apparatuses, and a display 19 which displays information including the LCD image, the test process and conditions and the like.

Figure 2:
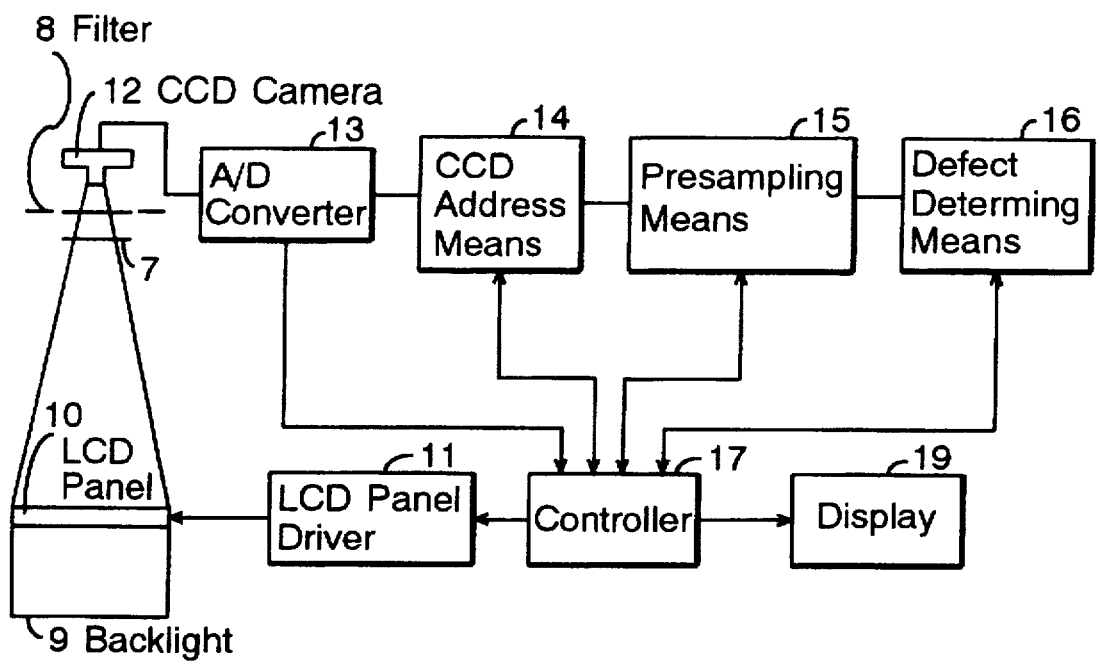
FIG. 2 is a block diagram showing a structure of the LCD panel test apparatus of the conventional example.
Figure 3:
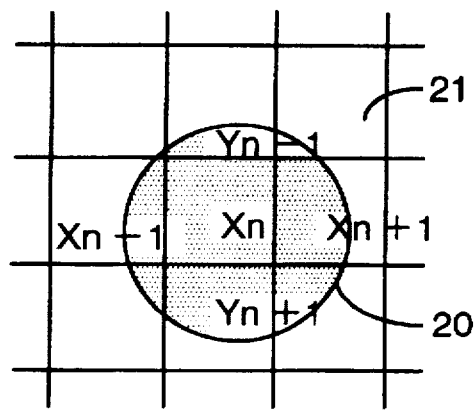
FIG. 3 is a schematic plan view showing a relationship between CCD pixels and a calibration dot displayed on an LCD pixel of an LCD panel to be tested for determining CCD addresses corresponding to the LCD pixel.
Figure 4:
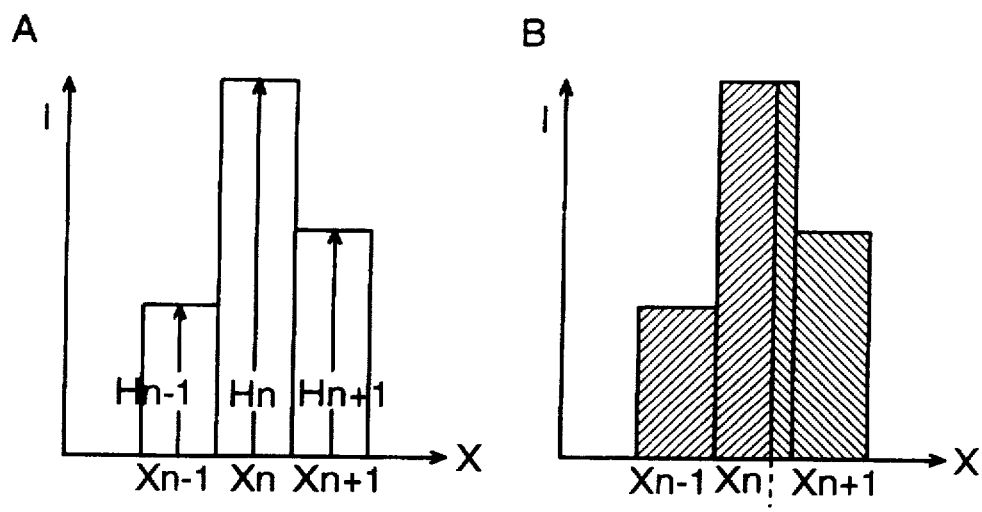
FIGS. 4A and 4B are schematic graphs for explaining a process of determining the precise CCD addresses based on the calibration dot and the CCD pixels shown in FIG. 3.
Figure 5:
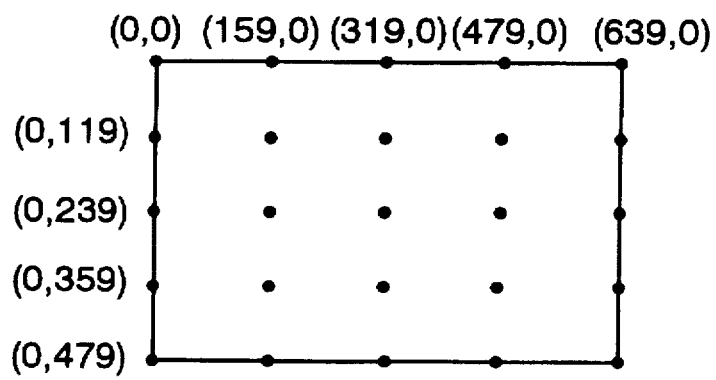
FIG. 5 is a schematic diagram showing an example of calibration pattern displayed by an LCD panel to be tested at an initial stage of the testing.

Therefore, in the present invention, to provide an automatic compensation function, the ND filter, the image compensation means 30 and the correction table 31 are added to the conventional example of FIG. 2. In the arrangement of the present invention, the compensation of the measured data is proceeded as in the following:

(1) After defining the CCD addresses of the LCD pixels by the process noted above with reference to the background of the invention, the LCD panel 10 is removed from the test apparatus and the ND filter 7 is installed between the CCD camera 12 and the backlight 9. The ND filter 7 is to adjust the light from the backlight 9 to the CCD camera 12. Under this setting, the intensity of the backlight 9 is measured for all the addresses corresponding to the LCD pixels through the red (R), green (G), blue (B) and semi-transparent (W) filters.

(2) Based on the intensity data obtained in the step (1) above, an average intensity for the overall LCD panel is calculated for each filter. Such average values are expressed as /R, /G, /B and /W, respectively, wherein /R, for example, designates the average value through the red filter.

(3) Pixel coefficients are determined for each LCD pixel by dividing the average value obtained in the step (2) by the brightness data of each LCD pixel. Thus, the coefficients for all of the LCD pixels are established in the correction table 31 which are expressed as follows:

$k(R_{ij})=(/R)/R_{ij}$ $k(G_{ij})=(/G)/G_{ij}$ $k(B_{ij})=(/B)/B_{ij}$ $k(W_{ij})=(/W)/W_{ij}$ where $R_{ij}$, for example, designates the intensity data measured through the red filter.

(4) Then, the LCD panel 10 to be tested is placed in the LCD panel test apparatus while the ND filter 7 is removed from the LCD test apparatus. The brightness for each pixel of the LCD is measured by the LCD panel test apparatus. The measured data for each pixel is multiplied by the coefficient of the pixel stored in the correction table 31 to compensate the differences between the LCD panel test apparatuses.

The compensated data obtained by the above process cancels the differences between the LCD panel test apparatuses for the overall pixels of the LCD panel 10.

Further, to compensate the intensity differences between the R, G, B and W filters, or to equalize the average intensity of the values /R, /G, /B and /W, the following process may be preferably carried out. Namely, to establish calibration coefficients in such a situation, one of the average value, such as /G is used as a reference. The calibration coefficients as follows are stored in the correction table 31.

$k(/R)=(/G)/(/R)$ $k(/B)=(/G)/(/B)$ $k(/W)=(/G)/(/W)$

Each of the coefficient is multiplied to each of the brightness data of the LCD pixel obtained when placing the LCD panel 10 on the LCD test apparatus. By this process, the differences in the intensity caused by the differences of performance between the filters are compensated.

(6) Alternatively, the differences arisen between the filters and between the performance of test apparatuses can be compensated by using a constant value C as a reference for establishing calibration coefficients. Such coefficients are calculated in the following manner.

$k(/R)=C/(/R)$ $k(/G)=C/(/G)$ $k(/B)=C/(/B)$ $k(/W)=C/(/W)$

Each of the coefficient is multiplied with each of the brightness data of the LCD pixel obtained when placing the LCD panel 10 on the LCD test apparatus. By this process, the differences in the intensity caused by the differences between the filters and also the differences of performance between the LCD test apparatus are compensated.

As has been foregoing, according to the present invention, the LCD panel test apparatus is capable of automatically compensating the differences in the absolute values of measured data among the test apparatuses. The LCD panel test apparatus of the present invention automatically compensates the differences arise in a hardware performance such as an intensity of the backlight, a sensitivity of CCD camera, characteristics of the RGBW filters or an amplifier gain and other performances of the A/D converter in each LCD panel test apparatus.

In the present invention, the LCD panel test apparatus automatically compensates the differences among the LCD panel test apparatuses by multiplying the measured data with correction coefficients stored in a correction table. Accordingly, the LCD panel test apparatus of the present invention can compensate the differences among the LCD panel test apparatuses with high accuracy and efficiency without being subject to reading errors of a user.

What is claimed is:

1. An LCD panel test apparatus for testing a liquid crystal display (LCD) panel, comprising:

a backlight provided under an LCD panel under test to illuminate said LCD panel under test;

a CCD camera provided over said LCD panel under test and having a charge coupled device (CCD) sensor to monitor light signals;

a filter provided between said LCD panel under test and said camera to allow one color of light to pass therethrough;

an LCD panel driver which provides a drive signal to said LCD panel under test to display a calibration pattern or various test patterns on said LCD panel under test;

an analog-to-digital converter which receives the measured data from said CCD camera to digital data;

a CCD address means which receives said digital data from said analog-to-digital converter and specifies positions of pixels in said CCD sensor corresponding to pixels of said LCD panel under test utilizing dots in said calibration pattern and defines CCD sampling addresses for all of said LCD pixels based on said CCD positions;

a presampling means which receives said CCD sampling addresses from said CCD address means and image data measured by said CCD camera indicating an image displayed on said LCD panel under test and converts said image data to data corresponding to each pixel of said LCD panel under test based on the said sampling addresses;

a defect determining means which receives said converted data converted from said defect determining means and determines defective pixels of said LCD panel under test based on said data corresponding to said each pixel of said LCD panel under test;

a correction table which stores correction coefficients, said correction coefficients being obtained by replacing said LCD panel under test with a neutral density filter, each of said correction coefficients being a ratio between an average intensity obtained through a sum of intensities corresponding to all of said pixels of said LCD panel under test and an intensity corresponding to a specific pixel of said LCD panel under test;

an image compensation means which connects to said presampling means and said correction table and compensates differences in measured data between two or more LCD panel test apparatuses using said correction coefficients; and a controller for controlling an overall operation of said LCD panel test apparatus.

2. An LCD panel test apparatus as defined in claim 1, further includes a display connected to said controller to illustrate test results of said LCD panel under test or test conditions defined for testing said LCD panel under test.

3. An LCD panel test apparatus as defined in claim 1, wherein said color of said filter includes red, green, blue and semi-transparent.

4. An LCD panel test apparatus as defined in claim 1, wherein said correction coefficients are determined by measuring an intensity of said backlight through said neutral density filter and a selected color of said filter.

5. An LCD panel test apparatus as defined in claim 1, wherein each of said correction coefficients is a ratio between said average intensity and a predetermined constant intensity.

6. A method of testing an LCD panel by an LCD panel test apparatus including a CCD camera which has a CCD sensor having a larger number of pixels than that of the LCD panel under test, said method comprising the following steps of:

displaying a calibration pattern on the LCD panel to be tested which is illuminated by a backlight provided under said LCD panel under test;

determining CCD addresses of said CCD camera defining all of pixels of said LCD panel under test based on said calibration pattern;

removing said LCD panel under test and placing a neutral density filter and a set of color filters which can selectively set one of red, green and blue filters;

determining correction coefficients for said LCD panel test apparatus corresponding to each pixel of said LCD panel under test and storing said correction coefficients in a correction table;

replacing said neutral density filter with said LCD panel under test and measuring intensity data for each pixel of said LCD panel by said CCD camera; and multiplying said intensity data for each pixel of said LCD panel under test with corresponding correction coefficient stored in said correction table.

7. A method of testing an LCD panel as defined in claim 6, wherein said correction coefficients are determined by the following steps of:

measuring a light intensity of said backlight through said neutral density filter and one of said color filters for said CCD addresses corresponding to all of said LCD pixels;

calculating an average intensity of overall addresses corresponding to all pixels of said LCD panel under test for each color of said color filters; and dividing an intensity for each address corresponding to each pixel of said LCD panel under test by said average intensity of each color filter.

8. A method of testing an LCD panel as defined in claim 7, wherein other type of said correction coefficients are determined by dividing a constant intensity value by said average intensity for each color filter.

* * * * *